United States Patent
Diehl et al.

(10) Patent No.: US 10,315,363 B2
(45) Date of Patent: Jun. 11, 2019

(54) FUNCTIONAL ELEMENT

(71) Applicant: PROFIL Verbindungstechnik GmbH & Co. KG, Friedrichsdorf (DE)

(72) Inventors: Oliver Diehl, Usingen (DE); Richard Humpert, Bad Nauheim (DE)

(73) Assignee: PROFIL VERBINDUNGSTECHNIK GMBH & CO. KG, Friedrichsdorf (DE)

(*) Notice: Subject to any disclaimer, the term of this patent is extended or adjusted under 35 U.S.C. 154(b) by 139 days.

(21) Appl. No.: 15/449,326

(22) Filed: Mar. 3, 2017

(65) Prior Publication Data

US 2017/0259493 A1    Sep. 14, 2017

(30) Foreign Application Priority Data

Mar. 8, 2016    (DE) .................. 10 2016 104 187

(51) Int. Cl.
    *B29C 65/52*      (2006.01)
    *F16B 11/00*      (2006.01)
    *F16B 37/04*      (2006.01)

(52) U.S. Cl.
    CPC .......... *B29C 65/524* (2013.01); *F16B 11/006* (2013.01); *F16B 37/048* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,785,907 A | * | 1/1974 | Barr ...................... | A41H 37/08 156/196 |
| 3,802,605 A | | 4/1974 | Standlick | |
| 3,898,119 A | * | 8/1975 | Barr ...................... | B60R 22/18 112/470.33 |
| 4,985,191 A | * | 1/1991 | Hannon, Jr. ........ | B29C 33/0077 264/135 |
| 5,566,446 A | * | 10/1996 | Luckhardt ............. | B21J 15/32 227/120 |
| 6,217,684 B1 | * | 4/2001 | Morii ...................... | B23P 19/04 156/275.5 |
| 6,224,709 B1 | * | 5/2001 | Takemoto .............. | C09J 5/00 156/275.5 |

(Continued)

FOREIGN PATENT DOCUMENTS

| | | |
|---|---|---|
| DE | 2249032 A1 | 4/1973 |
| DE | 102004062391 A1 | 7/2006 |

(Continued)

OTHER PUBLICATIONS

Official Communication from German Patent Office for related German Application No. 102016104187.4; dated Jan. 25, 2017; 2 pages.

*Primary Examiner* — Sing P Chan
(74) *Attorney, Agent, or Firm* — Cantor Colburn LLP

(57) ABSTRACT

An apparatus and a method are provided for attaching functional elements of metal to a component, in particular to a component comprising fiber reinforced plastic, using a setting head, wherein the functional element has a contact surface (12) provided with adhesive. In this respect, the adhesive within the setting head is applied to the functional element before the attachment of the functional element to the component.

17 Claims, 6 Drawing Sheets

(56) References Cited

U.S. PATENT DOCUMENTS

Figure 1A:
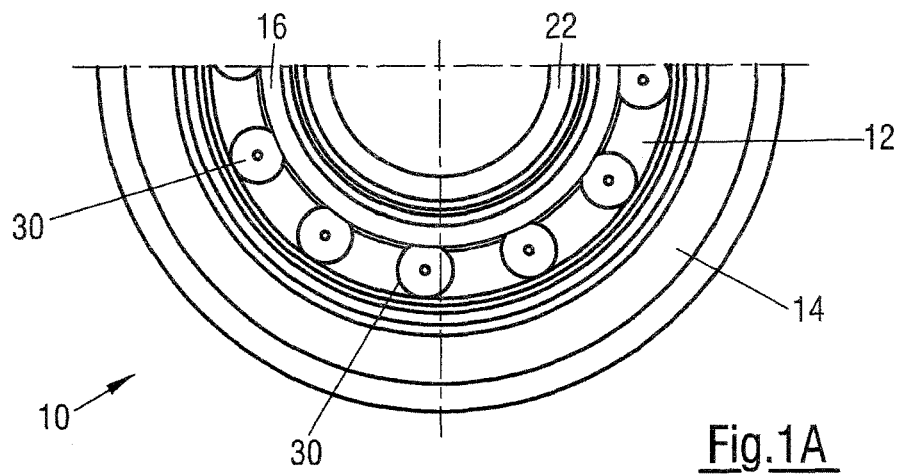

| | | | | |
|---|---|---|---|---|
| 6,435,241 B1* | 8/2002 | Morii | ............... | B23P 19/04 156/351 |
| 6,471,801 B2* | 10/2002 | Takemoto | ............... | C09J 5/00 156/60 |
| 6,503,358 B1* | 1/2003 | Takemoto | ............... | C09J 5/00 156/295 |
| 6,544,376 B2* | 4/2003 | Takemoto | ............... | C09J 5/00 156/273.3 |
| 6,575,221 B2* | 6/2003 | Morii | ............... | B29P 19/04 156/578 |
| 6,726,806 B2* | 4/2004 | Takemoto | ............... | C09J 5/00 156/379.6 |
| 7,040,741 B2* | 5/2006 | Nakamura | ............... | B41J 2/1433 347/71 |
| 7,160,072 B2* | 1/2007 | Humpert | ............... | B23P 19/062 403/279 |
| 7,322,086 B2* | 1/2008 | Humpert | ............... | B23P 19/062 29/21.1 |
| 7,427,332 B2* | 9/2008 | Takemoto | ............... | C09J 5/00 156/275.5 |
| 7,480,971 B2* | 1/2009 | Oliver | ............... | B23P 19/062 29/33.5 |
| 7,510,272 B2* | 3/2009 | Nakamura | ............... | B41J 2/1433 347/40 |
| 7,735,209 B2* | 6/2010 | Diehl | ............... | B21J 15/12 29/243.5 |
| 7,752,879 B2* | 7/2010 | Diehl | ............... | B21J 15/12 29/509 |
| 8,210,315 B2* | 7/2012 | Diehl | ............... | F01M 11/0408 184/1.5 |
| 8,371,783 B2* | 2/2013 | Diehl | ............... | F16B 5/02 411/103 |
| 8,499,891 B2* | 8/2013 | Diehl | ............... | F01M 11/0408 184/1.5 |
| 8,533,928 B2* | 9/2013 | Diehl | ............... | B21J 15/12 29/243.5 |
| 8,591,158 B2* | 11/2013 | Diehl | ............... | F16B 5/02 411/103 |
| 8,753,054 B2* | 6/2014 | Diehl | ............... | F16B 19/08 411/190 |
| 8,839,486 B2* | 9/2014 | Diehl | ............... | B21J 15/025 16/2.1 |
| 8,888,426 B2* | 11/2014 | Diehl | ............... | B29C 65/5057 411/258 |
| 9,080,589 B2* | 7/2015 | Diehl | ............... | F16B 19/08 |
| 9,121,434 B2* | 9/2015 | Diehl | ............... | F01M 11/0408 |
| 9,188,148 B2* | 11/2015 | Diehl | ............... | B29C 65/5057 |
| 9,297,405 B2 | 3/2016 | Diehl | | B29P 19/00 |
| 9,651,081 B2* | 5/2017 | Diehl | ............... | B29C 65/5057 |
| 9,844,810 B2* | 12/2017 | Diehl | ............... | B21J 15/025 |
| 2001/0011577 A1* | 8/2001 | Takemoto | ............... | C09J 5/00 156/275.5 |
| 2001/0011578 A1* | 8/2001 | Takemoto | ............... | C09J 5/00 156/275.5 |
| 2001/0020508 A1* | 9/2001 | Moril | ............... | B23P 19/04 156/64 |
| 2001/0054479 A1* | 12/2001 | Takemoto | ............... | C09J 5/00 156/275.5 |
| 2003/0076378 A1* | 4/2003 | Nakamura | ............... | B41J 2/1433 347/33 |
| 2004/0154724 A1* | 8/2004 | Takemoto | ............... | C09J 5/00 156/85 |
| 2004/0195355 A1* | 10/2004 | Bolyard, Jr. | ............... | B05C 5/0225 239/128 |
| 2005/0025564 A1* | 2/2005 | Humpert | ............... | B23P 19/062 403/282 |
| 2005/0172469 A1* | 8/2005 | Humpert | ............... | B23P 19/062 29/243.5 |
| 2005/0244243 A1* | 11/2005 | Diehl | ............... | B21J 15/12 29/243.5 |
| 2005/0244246 A1* | 11/2005 | Diehl | ............... | B21J 15/12 411/176 |
| 2006/0092225 A1* | 5/2006 | Nakamura | ............... | B41J 2/1433 347/47 |
| 2007/0214624 A1* | 9/2007 | Oliver | ............... | B23P 19/062 29/33.5 |
| 2009/0113972 A1* | 5/2009 | Diehl | ............... | B21J 15/12 72/112 |
| 2009/0218168 A1* | 9/2009 | Diehl | ............... | F01M 11/0408 184/1.5 |
| 2010/0124471 A1* | 5/2010 | Diehl | ............... | F16B 5/02 411/103 |
| 2010/0275433 A1* | 11/2010 | Diehl | ............... | B21J 15/12 29/514 |
| 2012/0087764 A1* | 4/2012 | Diehl | ............... | B29C 65/5057 411/82.2 |
| 2012/0088075 A1* | 4/2012 | Diehl | ............... | B29C 65/5057 428/192 |
| 2012/0199420 A1* | 8/2012 | Diehl | ............... | F01M 11/0408 184/1.5 |
| 2012/0285772 A1* | 11/2012 | Diehl | ............... | F01M 11/0408 184/1.5 |
| 2013/0129443 A1* | 5/2013 | Diehl | ............... | F16B 5/02 411/103 |
| 2013/0185917 A1* | 7/2013 | Diehl | ............... | B23P 19/00 29/456 |
| 2013/0189051 A1* | 7/2013 | Diehl | ............... | F16B 19/08 411/190 |
| 2013/0223923 A1* | 8/2013 | Diehl | ............... | B21J 15/025 403/278 |
| 2014/0241831 A1* | 8/2014 | Diehl | ............... | F16B 19/08 411/427 |
| 2015/0037114 A1* | 2/2015 | Diehl | ............... | B29C 65/5057 411/82 |
| 2017/0259493 A1* | 9/2017 | Diehl | ............... | B29C 65/524 |
| 2018/0036790 A1* | 2/2018 | Diehl | ............... | B21J 15/025 |
| 2018/0071992 A1* | 3/2018 | Diehl | ............... | B23P 19/062 |
| 2018/0100528 A1* | 4/2018 | Ellis | ............... | B21J 15/06 |
| 2018/0100529 A1* | 4/2018 | Humpert | ............... | F16B 19/05 |

FOREIGN PATENT DOCUMENTS

| | | |
|---|---|---|
| DE | 102009057332 A1 | 6/2011 |
| EP | 0633825 A1 | 1/1995 |
| EP | 0755749 A1 | 1/1997 |
| EP | 0864396 A2 | 9/1998 |
| EP | 1116891 A1 | 7/2001 |
| EP | 2439055 A2 | 4/2012 |

* cited by examiner

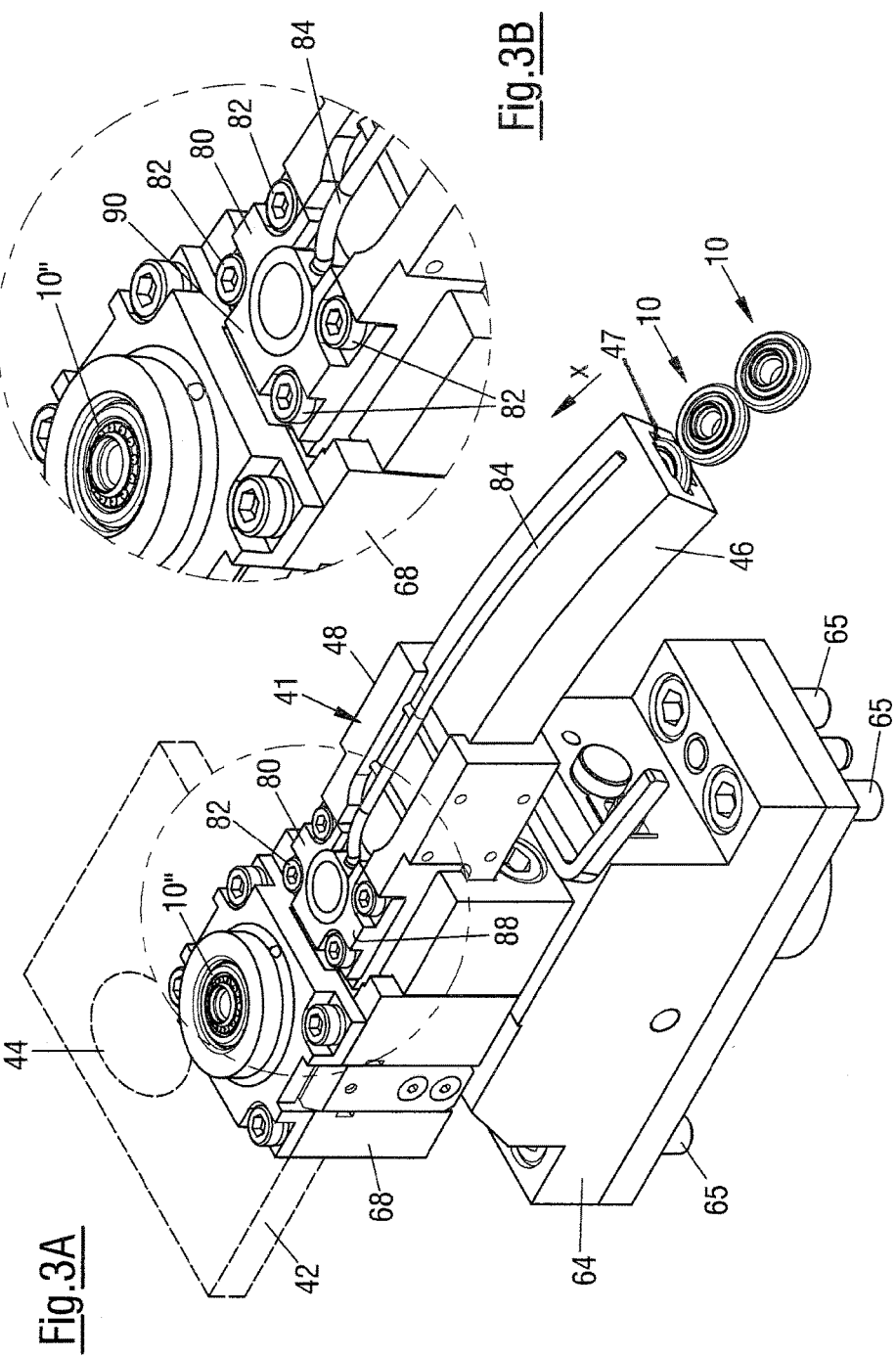

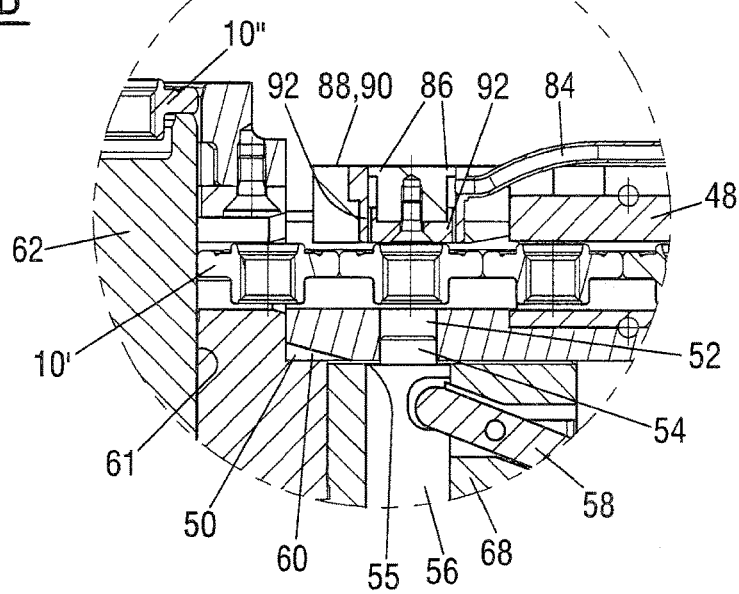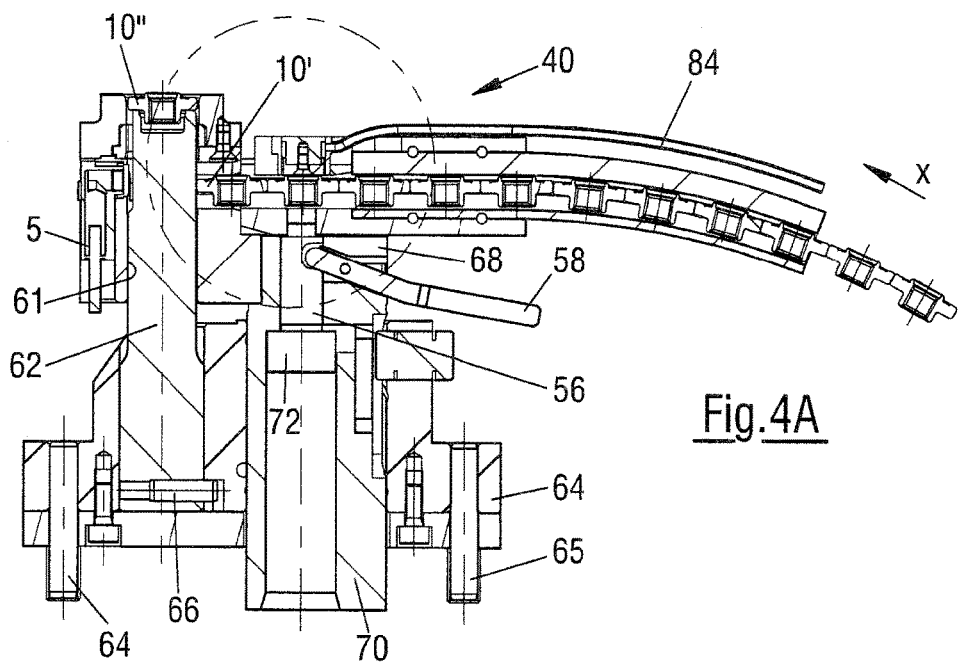

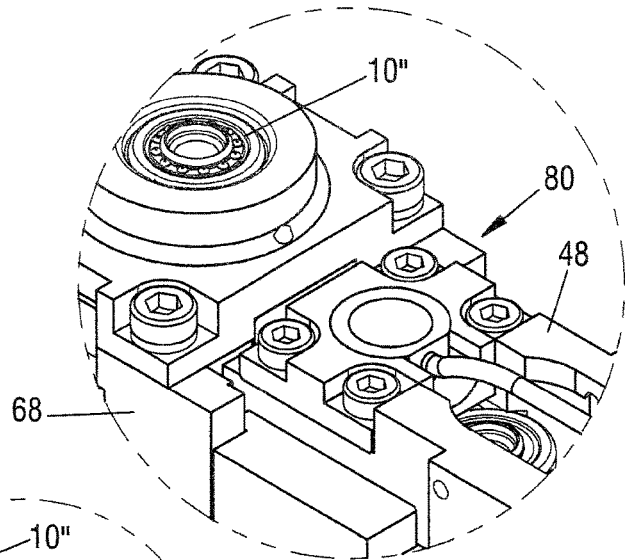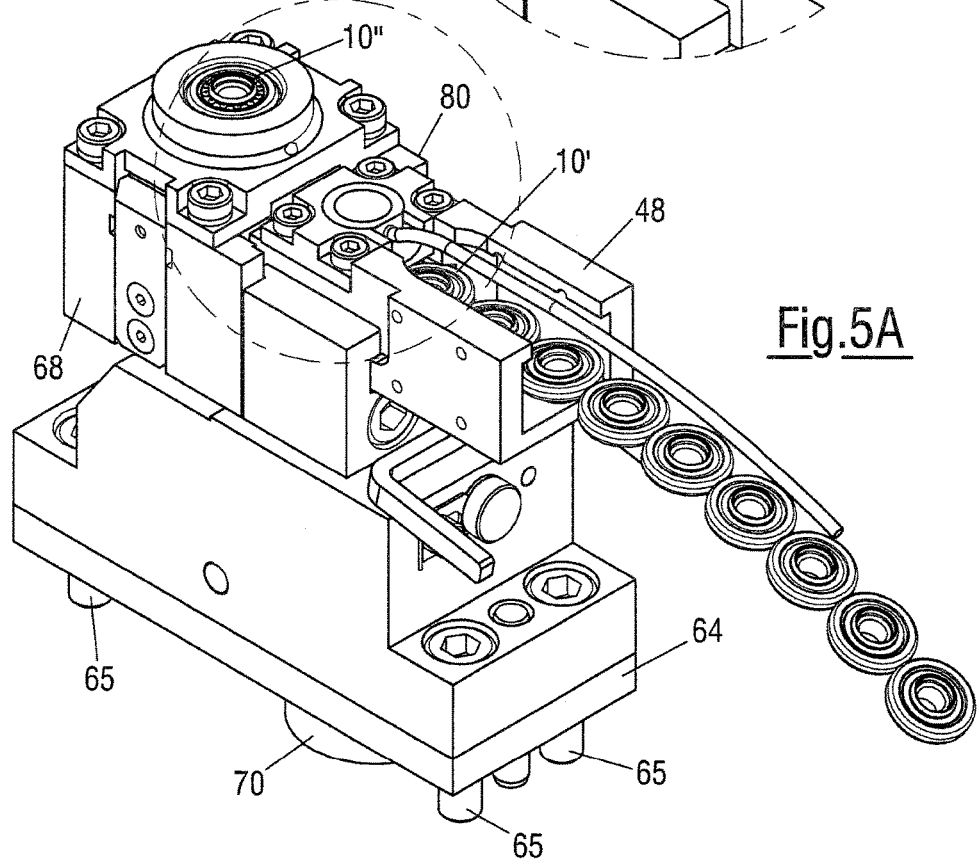

FUNCTIONAL ELEMENT

The present invention relates to an apparatus for use at a setting head for the application of adhesive to a functional element that is adhesively bonded to a component, in particular to a plastic component, and to a method of attaching a functional element to a component, in particular to a plastic component.

Functional elements composed of metal having a flange of a larger diameter forming an attachment surface and having a centering section arranged within the attachment surface and extending away from the flange are widespread and well-known for use with metallic components. An example can be seen from European patent specification EP 1116891 of the present applicant that describes a so-called RND nut. That is, the functional element is formed as a nut element in the named European patent. The centering section is formed as a rivet section there that is deformed after or during the attachment to form a rivet flange.

As part of the endeavor toward molded parts of low weight, but high strength, plastic components, primarily in the form of composite materials such as glass fiber reinforced or carbon fiber reinforced plastics, are frequently used today instead of sheet metal parts, with, however, other reinforcing materials also being able to be considered, typically those with high-strength reinforcing fibers or fabrics manufactured from such fibers. Components of such plastics frequently also have to be provided with fastening elements, for which purpose a limited choice of possibilities is already known. In this connection, press-in elements are, for example, known that are typically pressed into matched bores of the plastic material at elevated temperatures of the material. The plastic material flows around the inserts and into undercuts provided there and anchors the inserts in a cold state. The inserts can be provided with an internal thread, for example. Such inserts are admittedly by all means justified, but can mostly only be loaded with limitations since they may otherwise be pulled into or out of the plastic component. The use of such inserts is particularly problematic with relatively thin plastic components. Such fiber reinforced plastic components or a plastic component reinforced with a fabric are frequently called organic plastic sheets.

It is known from EP 2439055 A to provide a functional element similar to an RND element with an adhesive ring to adhesively bond it to a component, e.g. to a plastic component, in particular to a fiber reinforced plastic component or to a plastic component reinforced with a fabric. The nut element in accordance with EP 2439055 A is admittedly formed as a centering element, but the centering section shown there could also be formed as a rivet section, with the functional element then not only being adhesively bonded to the component, but also being additionally fastenable by beading over the rivet section at the component.

The present invention deals with the application of the adhesive to the functional element and the apparatus claimed here or the method claimed here can in principle be used with all kinds of fastening elements.

Functional elements can by all means also have different forms. For example, a bolt element can have a cylindrical shaft part instead of a thread and said cylindrical shaft part can serve to support a lever, a cable pulley or another component. A hollow element, similar to a nut element, can also be considered in which, instead of a threaded cylinder, a smooth bore is provided that serves for the support of a shaft. Functional elements are furthermore known that can be formed for receiving an inserted pin or a clip. Functional elements in accordance with the invention can also be formed for carrying out the corresponding functions.

The provision of adhesive at functional elements can be problematic. Even if the adhesive is accommodated at the functional element in a protected manner or is present in dry form, for example in small mixed capsules of adhesive and hardener that only burst under pressure and form an activated vacuum or a plastic hardened in another manner, there is always the risk that the adhesive is damaged or is even lost during the handling of functional elements or during the transport from one work site to another. This risk is also present when the plastic is present in the form of rings of double-sided adhesive tape.

It is the object of the preset invention to provide an apparatus and a method that very greatly prevents the above-named problem of damage to or the loss of the adhesive.

To satisfy these objects, in accordance with the invention an apparatus for the attachment of functional elements, e.g. of metal, to a component, in particular to a component comprising fiber reinforced plastic, is provided using a setting head, wherein the functional element has a contact surface provided with adhesive, with the special characteristic that the apparatus is configured to apply the adhesive to the functional element within the setting head before the attachment of the functional element to the component.

When functional elements of e.g. metal are spoken of in this application, it is intended to express that the functional elements typically only consist of metal. It is, however, not precluded that a functional element of fiber reinforced plastic is used, with it also being conceivable to equip such a functional element with a metal core, for example in the manner of a threaded insert.

Since the adhesive is only applied to the functional elements within the setting head or directly before the entry into the setting head, the risk that the adhesive is damaged or is lost or is otherwise impaired, for example by aging, before reaching the setting head is no longer present.

The apparatus can be adapted in this respect such that it has an injection system to apply the adhesive in ring form or in droplet form to the contact surface within the setting head. The adhesive can hereby be restricted to the desired region of the contact surface.

The attachment of the functional elements into plastic components by means of a setting head can take place using a number of different apparatus. It is conceivable to use the setting head in a press. The setting head on which the component is arranged can be arranged facing upward in a lower tool of the press or in an intermediate plate of the press and the functional element can be pressed from below onto the plastic component by means of the setting head, and indeed toward a die that is held in an intermediate plate of the press or in an upper tool of the press. In this respect, the component can be prepunched in a manner known per se or the functional element can be introduced into the component in a self-punching manner.

The arrangement with the upwardly facing setting head, which simultaneously means that the contact surface of the functional element facing upward, is preferred since the adhesive is transported in a substantially loss-free manner on the functional elements within the setting head.

It is nevertheless also conceivable to arrange the setting head facing downwardly in an intermediate plate of the press or in the tool of the press and then to provide the die in the lower tool of the press or in the intermediate plate of the press that supports the component from the lower side.

One functional element or a plurality of functional elements can then be simultaneously attached to the plastic component for every stroke of the press. The press can then be set such that it, on the one hand, only closes to the amount required to attach the functional element to the plastic component in the manner in accordance with the invention and to exert sufficient pressure onto the adhesive to ensure the adhesive function.

Another possibility comprises inserting functional elements into or attaching them to the plastic component by means of a robot. The robot can here, for example, bear an apparatus similar to a setting head that presses the element onto the one side of the plastic component while the plastic component is held on a support or on a die from above or from below that is likewise borne by the robot.

A stationary device can furthermore be used to hold the die and only the setting head can be actuated by the robot. A reverse order would also be conceivable, i.e. the robot presses the die onto the one side of a plastic component whose other side is held by a holder that supports the functional element, for example.

It is additionally possible to work with force-operated tongs that press the plastic component and the setting head toward one another or hold a die from the one side of the plastic component and press the setting head onto the plastic component and onto the die from the other side.

Irrespective of which apparatus is used to actuate the setting head, the injection system is preferably arranged above the contact surface of the respective functional element provided with adhesive to dispense adhesive downwardly onto this contact surface. The risk of contamination of the setting head with adhesive is hereby minimized.

The apparatus in accordance with the invention is preferably configured in that the injection system comprises a line conducting the adhesive, a distributor receiving adhesive from the line and having a distributor passage, and a plurality of injection bores or nozzles distributing adhesives from the distributor passage. Such an arrangement can be built in a very compact manner.

The injection system is preferably arranged in the region of the opening of the supply passage for the functional elements into the setting head. This has the particular advantage that, if contamination arises by excessive adhesive, it is very largely restricted to the region of the mouth piece of the supply passage.

It is particularly favorable if the injection system can be attached to the mouth piece of the functional element of the supply passage leading into the setting head.

A possible contamination with adhesive is in this manner restricted to the region of the mouth piece that is relatively simple to clean. The mouth piece of the supply passage is in particular releasably connected to the setting head by means of a movable latching nose. The supply passage with the mouth piece can then be separated from the setting head in a simple manner for the purpose of cleaning.

The apparatus in accordance with the invention is furthermore configured such that, after the application of the adhesive to a functional element, this functional element is either immediately pushed into the die channel of the setting head or is only brought into a waiting position before the die channel.

A further preferred variant of the present invention comprises a flushing system being integrated in the setting head to flush adhesive residues out of the setting head as required. If therefore contamination with adhesive presents a problem, the flushing system can be used to dissolve and remove the contamination by means of a flushing means dissolving the adhesive at least in the non-hardened state.

It is particularly favorable if the flushing system feeds flushing means into the injection system, for example into its distributor passage. The injection system can hereby be used for a dual purpose namely for applying adhesive and for distributing the flushing means dissolving the adhesive and the flushing means is applied where contamination is most likely to be expected.

Particularly preferred methods for satisfying the object in accordance with the invention can be seen from claims 11 to 15.

Figure 1B:
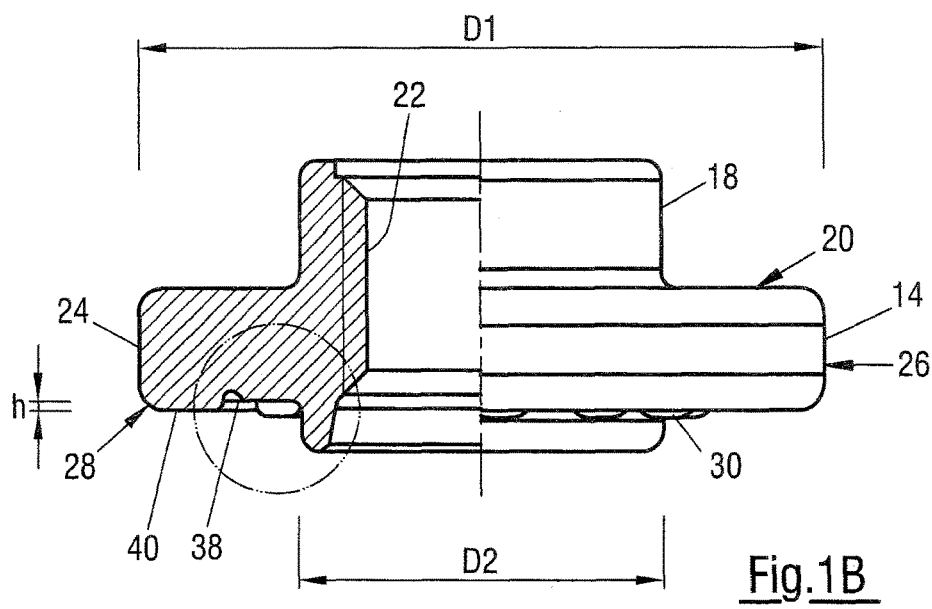
Figure 1C:
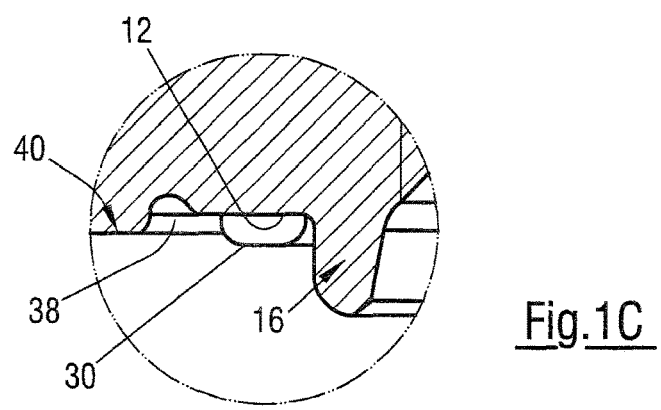
Figure 2:
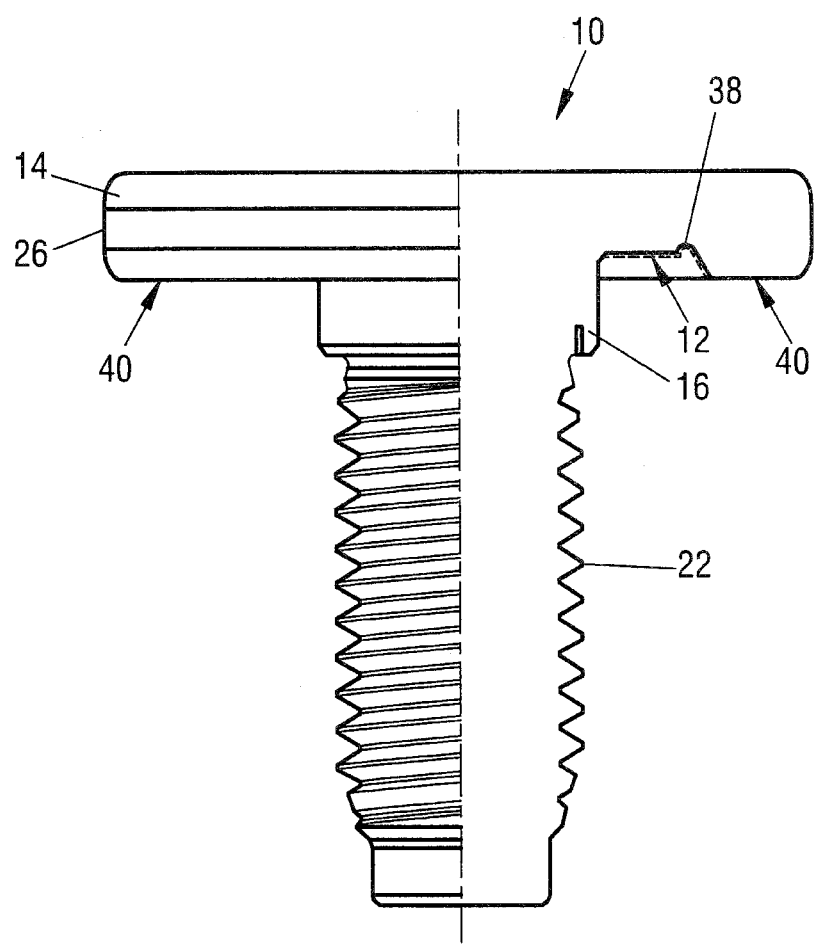
Figure 6B:
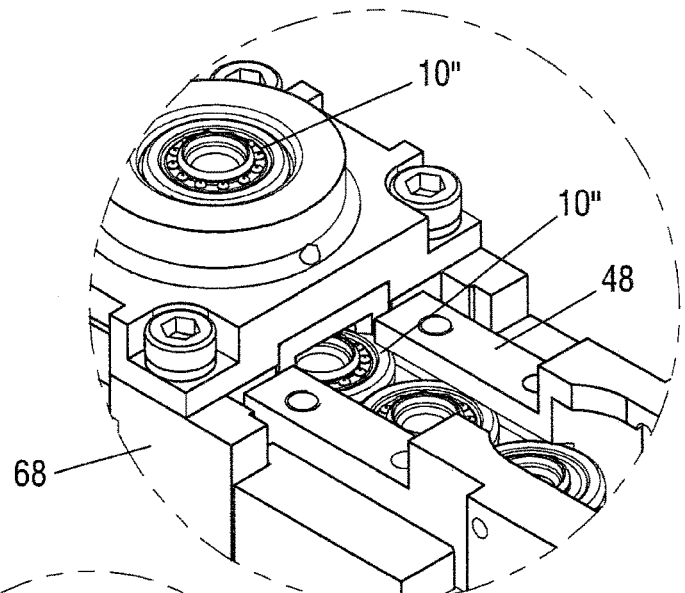
Figure 6A:
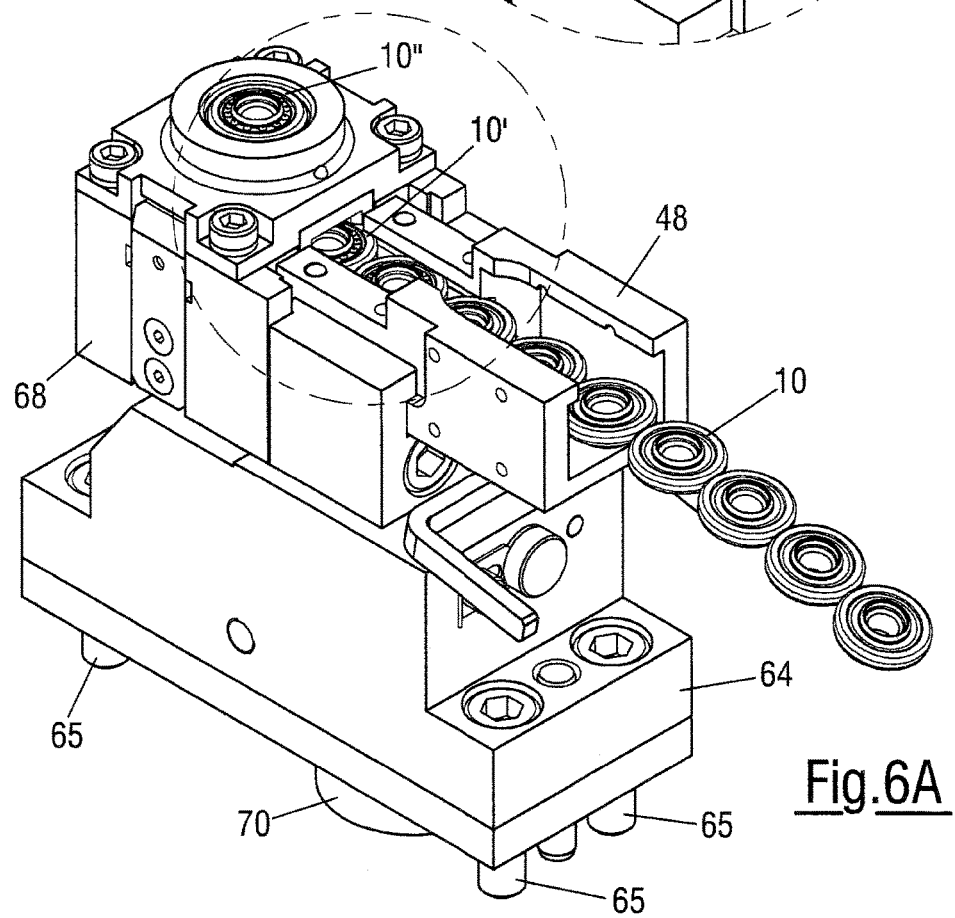

The invention will be described in more detail in the following with reference to embodiments and to the drawings, which show:

FIGS. 1A-1C a functional element whose basic shape is known from EP 2439055 A and that is shown here in a half-plan view from below (FIG. 1A), in a half-sectioned side view (FIG. 1B) with an enlarged illustration of the circled region of FIG. 1B (FIG. 1C);

FIG. 2 a functional element in the form of a bolt element whose basic shape is likewise known from EP 2439055 A and whose head shape is very similar to that of the nut element of FIGS. 1A-1C;

FIGS. 3A and 3B a schematic representation of an apparatus in accordance with the invention in the form of a setting head for applying adhesive to functional elements that are attached to a component by means of the setting head, with FIG. 3A being a perspective illustration of the setting head with supply passage and FIG. 3B showing an enlarged representation of the circled region of FIG. 3A;

FIGS. 4A and 4B sectional drawings through the setting head in accordance with the invention in accordance with FIGS. 3A and 3B;

FIGS. 5A and 6B schematic representations of the setting head in accordance with the invention in accordance with FIGS. 3A and 3B, but with the supply passage being removed, except for its mouth piece, for clarity; and FIGS. 6A and 6B schematic representations of the setting head in accordance with the invention in accordance with FIGS. 4A and 4B, but with the injection system being removed for clarity.

FIGS. 1A-1C show a functional element 10 of metal having a flange 14 of larger diameter D1 forming an attachment surface 12 and a centering section 16 of smaller diameter D2 arranged within the attachment surface 12 and extending away from the flange. The functional element, that is used here for explaining the present invention, is known per se from the European application EP 2439055 A. The only difference is that in the present invention the adhesive 30, instead of the ring-shaped arrangement in EP 2439055 A, is arranged in droplet form around the centering section 16. The ring-shaped arrangement in accordance with EP 2439055 A can, however, also be used here. The adhesive depot at the contact surface or at the attachment surface 12 can comprise ether distributed adhesive droplets or a ring of adhesive.

The adhesive 30 is thus arranged around the centering section 16 and adjacent to the region of the lower side of the flange 14 called an attachment surface 12 here. As can be seen from FIGS. 1B and 1C, the adhesive is fastened to the functional element 10 in the form of individual, at least substantially round, convex droplets 30.

It can furthermore be seen, in particular from FIGS. 1*b* and 1C that the ring of adhesive droplets 30 is approximately rectangular in section in a longitudinal plane including the longitudinal axis of the functional element and has a slightly convexly arched lower side.

A cylindrical projection 18 that merges via a radius in an upper side of the flange 14 in FIG. 1B is located, easily visible in FIG. 1B, above the flange 14. The ring surface 20 thus created forms a pressing surface that serves for the application of the required pressing force on the fastening of the functional element 10 to a plastic component. The thread 22 of the functional element 10 formed as a nut element here is protected against deformation by the pressing force by the provision of this ring surface 20. At the same time, the axial height of the protruding flange part 14 can be reduced to the required dimension and the weight of the functional element can hereby likewise be reduced.

It can be seen that the outer peripheral surface 24 of the functional element has a rounded shape that automatically arises on the manufacture of the functional element in a cold heading process. This rounded shape is of advantage because, on the one hand, it saves weight and, on the other hand, also forms a gentle transition from the axially parallel region 26 of the outer peripheral surface of the flange into the lower side of the flange. The rounded transition 28 avoids undesired notches at the surface of the plastic component or of the metal component.

In this embodiment, a recess 38 receiving excess adhesive is provided in the flange 14. A recess could alternatively or additionally be formed in the centering section (not shown).

The recess 38 is, as shown, preferably a ring recess which is formed radially outside of the attachment surface as an axial groove in the flange 14. Instead of this, the ring recess could also be arranged as a radial groove in the centering section 16 or radially within the attachment surface or interrupting the latter. Furthermore, the possibility exists, instead of providing a ring recess 38 (or as a supplement thereto—not shown) of providing a plurality of recesses which are arranged inside the attachment surface and about the longitudinal axis of the functional element, for example recesses in the form of radially extending grooves.

In FIGS. 1A to 1C the centering section is circular and ring-shaped in cross-section. It could however, if required, also have a polygonal or a grooved or ribbed shape.

It can in particular be seen from FIG. 1B, that the attachment surface 12 is arranged radially within a ring-like contact surface 40 and is set back relative to the latter in the axial direction of the centering section 16 by an amount h, which amounts for example to approximately 0.1 mm. The contact surface 40 thus forms an outer ring surface and the attachment surface 12 forms an inner ring surface, with the ring recess 38 which receives the excessive adhesive being provided between the contact surface 40 and the attachment surface 12.

The function element 10 is formed in FIGS. 1A-1C as a nut element; it could, however, equally be formed as a bolt element as is shown in FIG. 2.

It will be understood that the previous description of FIGS. 1A to 1C also applies in a transferred sense to a bolt element in accordance with FIG. 2 in which the same reference numerals are used and have the same meaning. The bolt element of FIG. 2 largely corresponds to the bolt element in accordance with the German patent application having the file reference 102004062391; only the head shape is here selected similar to that of the nut element in accordance with FIGS. 1A to 1C.

FIGS. 3A and 3B show an apparatus 41 in accordance with the invention for the attachment of functional elements 10, e.g. of metal, to a component 42, that is here only shown schematically by dashed lines in FIG. 3A. The component 42 can be a metal component or a fiber reinforced or fabric reinforced component of plastic in the form of a plate or of a three-dimensional molded part. The component can be prepunched as indicated at 44 or the functional elements can be introduced into the component in a self-punching manner, optionally while using a leading punching die (not shown). The fiber reinforced or fabric reinforced component of plastic can be a plurality of different composite materials, irrespective of whether having thermoplastic or thermosetting matrix material, and having all types of reinforcement fibers such as glass fibers, carbon fibers, ceramic fibers, etc.

The apparatus 41 substantially comprises a setting head known per se such as is known from EP-C-755749, in particular from its FIGS. 25 to 38D, but modified to accept an injection system in accordance with the invention. Since the setting head is known per se, it will only be described here to the extent necessary to explain how the embodiment in accordance with the invention works.

It is understood that the invention is not restricted to a specific type of setting head or to the functional elements used therewith, but rather that all setting heads and functional elements known per se that are already known in the industry can be considered. It is only important that the functional elements 10 have a contact surface 12 that can be provided with adhesive and preferably that a guide device having a guide passage 46 or a guide rail is provided to introduce the functional elements into the setting head in the correct position. The functional elements can be placed continuously into the setting head by a storing and conveying unit such as is known from EP-C-864396 or by lots from a magazine such as is known from EP-B-633825, FIG. 4, or even individually into a guide passage by hand.

The functional elements 10 can be pushed in the guide passage 46 either contacting one another along the guide passage or can be conveyed individually in the guide passage by air blasts into the setting head 41 such as is shown in EP-B-633825, FIG. 7.

In the specific example of FIGS. 3A to 4B. the functional elements, here in accordance with FIGS. 1A to 1C, are first pushed in the direction of the arrow X to the left without adhesive 30 contacting one another in a chain within the guide passage 46 in FIG. 3A. The guide passage 46 that can be formed by a metal rail or by a plastic rail has a rectangular outer cross-section and a hollow passage 47 having a cross-section in accordance with the side view of the functional elements 10.

In this example, the guide passage 46 can be considered as if it e.g. comes from a sorting and conveying unit in accordance with EP-C-864396. The guide passage 46 is provided at its end facing the setting head 41 with a hollow mouth piece 48 that is permanently attached to the guide passage 46 and that releasably latches in a correspondingly profiled mount 50 of the setting head 41, as can be seen from FIGS. 4A and 4B respectively.

The lower side of the mouth piece 48 specifically has a bore 52 into which a cylindrical latching nose 54 latches that is upwardly preloaded by spring force and that thus prevents the separation of the mouth piece 48, i.e. of the guide passage 46, from the setting head. The latching nose 54 merges over a ring shoulder 55 into a bolt 56 of larger diameter, said ring shoulder pressing toward the lower side of the mouth piece 48 and thus determining the position of the latching nose 54 in engagement with the mouth piece 48. An articulated manual lever 58 can be actuated by the operator to pull the latching nose 54 downwardly, whereby the guide passage 46 with the mouth piece 48 can be pulled out of the setting head as required. It can be seen that the front region of the lower side of the mouth piece 48 is chamfered at 60. The mouthpiece 49 can hereby be simply pushed into the mount 50 and the chamfer 60 presses the bolt 56 downwardly with the latching nose. As soon as the mouth piece has been completely pushed into the mount 50, the spring-preloaded bolt 56 jumps upward with the latching nose 54 into the latched position shown in FIGS. 4A and 4B.

It can be seen from FIGS. 4A and 4B that a functional element 10' is arranged in a waiting position to the left of the mouth piece 48, while a further functional element 10" is located further to the left in a die channel 61 on the topmost end of a die 62.

The setting head 41 has, as customary, a fastening part 64 that is fastened by means of screws 65 in a tool of a press or to a hand of a robot. The die 62 is fixedly connected to the fastening part 64 of the setting head 41 via a bolt 66, i.e. the setting head does not move with respect to this lower part. The setting head 41 furthermore comprises an upper part 68 that bears the mouth piece and that is upwardly preloaded by means of spring force in this example. The preload spring is not shown, but is located in this example within a guide cylinder 70 for the bolt 56 and is supported, on the one hand, at the tool of the press to which the fastening part 64 of the setting head is attached and, on the other hand, at a piston-like abutment 72 that is arranged at the lower end of the bolt 56. The piston-like abutment 72 can slide to a limited extent within the guide cylinder 70 to release the latching nose 54 and, as stated, pressed toward an end flange of the guide cylinder 70. The upper part 68 of the setting head is pushed so far forward from the fastening part that a functional element 10' can be pushed horizontally to the left, as shown in FIGS. 4A and 4B, into the die channel 61 before the upper end of the die 62. The upper part 68 of the setting head is arranged in a slidable manner with the fastening part, by the die 62, on the one hand, that is guided in the die channel and, on the other hand, by the guide cylinder 70 that is arranged in a slidable manner with the upper part 68 of the setting head in a guide bore 74 of the fastening part 64.

When the press closes or when the robot presses the setting head 41 toward the component 42, the upper part 68 of the setting head escapes upward in the direction of the fastening part 64 of the setting head. This movement loads the spring located in the guide cylinder 70 and the functional element 10" at the upper end of the die is attached to the provided position at the component 42.

Reference numeral 80 indicates an injection system that is configured to attach the adhesive depot 30 in accordance with FIG. 1A to the contact surfaces 12 of the functional elements 10. The injection system 80 is, in this example, fastened to the upper side of the front end of the mouth piece 48 by means of four bolts 82 and serves to apply the adhesive within the setting head 41, before the attachment of the functional element 10 to the component 42, to the functional element 10 respectively disposed directly beneath the injection system.

The injection system is configured for this purpose to apply the adhesive 30 in a ring shape or in droplet form to the contact surface 12 within the setting head. For this purpose, the injection system comprises a line 84 conducting the adhesive, a distributor 88 receiving adhesive from the line 84 and having a distributor passage 86 and a housing 90, and a plurality of injection bores 92 or nozzles distributing adhesives from the distributor passage 86 of ring shape here.

On each opening stroke of the press, a new functional element 10", that is provided with the adhesive 30, is brought into the transport and setting position in front of the setting die 62 by the pressure exerted onto the chain of functional elements, a further functional element 10', likewise already provided with adhesive, is brought into the waiting position, and a new functional element 10 is brought into position beneath the injection system 80 and is provided with adhesive 30 from the injection system. In the adjoining closing stroke of the press, the functional element 10" is attached to the component 42 by means of the setting die 62, the press opens again and the cycle described directly above repeats on every opening stroke of the press.

The injection system 80 or its housing 90 is thus attached in this example to the mouth piece 48 of the functional element into the supply passage 46 guiding the setting head by means of the bolts 82 and can be released with the mouthpiece from the setting head. This is in particular favorable for cleaning purposes, in particular when the mouth piece 48 of the supply passage 46 is releasably connected to the setting head 10 by means of a movable latching nose 54.

On the one hand, the apparatus is then adapted either to push the functional element 10 immediately into the die channel of the setting head or only to bring it into a waiting position in front of the die channel after the application of the adhesive to said functional element such that very little time is present in which the adhesive can be contaminated by foreign substances or can be otherwise damaged or can be lost, and the risk of contamination of the setting head is also very small—also by the upwardly facing position of the adhesive 30.

If the mouth pieces 48 becomes dirty with adhesive residues in the region of the front end, i.e. where the injection system 80 is arranged, the injection system with the mouth piece 46 can be quickly removed and cleaned by releasing the latching nose 54. Although in this embodiment an individual line 84 is provided for feeding the adhesive into the injection system, the number of lines can be selected accordingly or the line can be realized with concentric line passages on a use of a two-component adhesive or of a multi-component adhesive. On the use of a two-component adhesive or of a multi-component adhesive, a static mixer can also be used within the line 84, preferably directly in front of the housing 90 of the injection system or within the distributor passage. It might be sensible to install the static mixer that can be configured as an exchangeable disposable part into the line at a selected distance from the setting head so that the adhesive has already reached a degree of maturity on placement onto the contact surfaces 12 of the functional elements 10 that, on the one hand, enables a correct adhesion to the component 42, but, on the other hand, has already progressed so far that the adhesion has reached a sufficient strength just before the attachment to the component that the adhesion can be considered permanent. This also contributes to the avoidance of contamination within the setting head 41 or with the press.

The injection system, however, does not have to be fastened to the mouth piece 46; it would also be conceivable to mount the injection system directly at the setting head, for example above the waiting position assumed by the element 10', whereby the functional element 10' can be directly introduced into the die channel directly after the provision with adhesive.

A flushing system (not shown here) can be integrated in the setting head 41 to flush adhesive residues out of the setting head as required. It is particularly favorable if the flushing system feeds flushing means into the injection system 80, for example into its distributor passage 86. It is only necessary for this purpose to provide a flushing line similar to the adhesive line 84. If the mouth piece 48 is releasable from the setting head 41, the flushing system can flush the injection system in the region of the mouth piece with means dissolving adhesive and delivered via the flushing line and can thus flush out residues of adhesive from the mouth piece and from the injection system into a collection container with the liquid flushing means.

FIGS. 5A and 5B as well as 6A and 6B show the same apparatus as FIGS. 3A and 3B as well as 4A and 4B so that the description of FIGS. 3A and 3B as well as 4A and 4B also applies to FIGS. 5A and 5B as well as 6A and 6B. In FIGS. 5A and 5B, the upper side of the guide passage is removed or is shown in the cut-away state to make the arrangement clearer. In FIGS. 6A and 6B, the injection system is additionally unscrewed from the mouth piece 48 to show the inlet for the functional elements 10 into the die channel more clearly.

The adhesive can be commercial one-component or two-component adhesives that are customary in the automotive industry. It can, for example, be Sika Power 490 C. a two-part component adhesive for automobile construction and also specifically for composite applications. It can, however, also be used for sheet connections and has a very high strength. Sika Power 430 can be named as a further example, a one-component adhesive for automobile construction, likewise with high strength.

A hardening at an elevated temperature is provided for both variants, but the adhesives have sufficient strength for mounting the functional elements to the component. The hardening at an elevated temperature can take place after the cathodic dip coating by the heat that is anyway used for hardening the cathodic dip coating. The named Sika adhesives can be purchased from the company Sika Automotive GmbH in Hamburg, Germany.

It is particularly advantageous with this type of adhesive that no special measures have to be taken to bring about the hardening of the adhesive, no jets have to be used and it is not necessary to use encapsulated adhesives with special binding agents.

REFERENCE NUMERAL LIST 10 functional element
10' functional element in the waiting position
10' functional element in the die channel
12 contact surface or attachment surface
14 flange
16 centering section
18 cylindrical projection
20 ring surface
22 thread
24 peripheral surface
26 axial parallel region
28 rounded transition
30 adhesive, adhesive depot
38 recess
40 contact surface
41 apparatus or setting head
42 component
44 hole
46 guide passage
47 hollow passage
48 mouth piece
50 profiled mount
52 bore
54 latching nose
55 ring shoulder
56 bolt
58 hand lever
60 chamfer of mouth piece 48
61 die channel
62 die
64 securing part of the setting head 41
65 screws
66 bolt
68 upper part of the setting head 41
70 guide cylinder
72 piston-like abutment
80 injection system
82 bolt
84 line for adhesive
86 distributor passage
88 distributor
90 housing of the injection system 80
92 nozzles
D1 larger diameter
D2 smaller diameter
h amount of axial offset of the attachment surface 12 and the contact surface 40
X arrow direction

The invention claimed is:

1. An apparatus for attaching a functional element to a component, the apparatus comprising:
   a setting head; and
   an injection system to apply an adhesive in ring shape or in droplet form onto a contact surface of the functional element within the setting head before the attachment of the functional element to the component at the functional element, the injection system arranged in a region of a mouth piece of a supply passage for the functional element in the setting head.

2. The apparatus in accordance with claim 1, wherein the functional element is a metal functional element and/or the component is a component comprising fiber reinforced plastic.

3. The apparatus in accordance with claim 1, wherein the injection system is arranged above the contact surface of the functional element respectively provided with adhesive and dispenses the adhesive downwardly onto this contact surface.

4. The apparatus in accordance with claim 1, wherein the injection system comprises:
   a line guiding the adhesive;
   a distributor receiving adhesive from the line;
   a distributor passage; and
   a plurality of injection bores or nozzles distributing adhesive from the distributor passage.

5. The apparatus in accordance with claim 1, wherein the injection system is attachable to the mouth piece of the supply passage guiding functional element into the setting head.

6. The apparatus in accordance with claim 1, wherein the mouth piece of the supply passage is releasably connected to the setting head by means of a movable latching nose.

7. The apparatus in accordance with claim 1, wherein the apparatus is adapted either to push a functional element immediately into a channel of the setting head or only to bring it into a waiting position in front of the channel after the application of the adhesive to said functional element.

8. The apparatus in accordance with claim 1, further comprising a flushing system integrated in the setting head to flush adhesive residues out of the setting head as required.

9. The apparatus in accordance with claim 8, wherein the flushing system feeds flushing means into the injection system.

10. The apparatus in accordance with claim 9, wherein the flushing system feeds flushing means into a distributor passage of the injection system.

11. A method of attaching a functional element to a component using a setting head, the method comprising:

applying an adhesive in a region of an opening of a supply passage for the functional element to a contact surface of the functional element with an injection system within the setting head before the attachment of the functional element to the component, the injection system arranged in the region of a mouth piece of a supply passage for the functional element in the setting head.

12. The method in accordance with claim 11, wherein the functional is a metal functional element and/or the component is a component comprising fiber reinforced plastic.

13. The method in accordance with claim 11, wherein the injection system is arranged above the contact surface of the respective functional element to be provided with adhesive method further comprising:

dispensing the adhesive downwardly onto this contact surface.

14. The method in accordance with claim 11, further comprising:

distributing the adhesive onto the functional element by means of the injection system via a distributor passage having feeding nozzles.

15. The method in accordance with claim 11, wherein the apparatus is adapted either to push a functional element immediately into a channel of the setting head or only to bring it into a waiting position in front of the channel after the application of the adhesive to said functional element.

16. The method in accordance with claim 11, wherein a flushing system is used to liberate the supply passage in the region of the injection system and in the region of the mouth piece of the supply passage, as well as optionally in the region of the setting head from adhering, unwanted plastic.

17. The method in accordance with claim 16, wherein the flushing system feeds flushing means into at least one of the injection system and a distributor passage of the injection system.

\* \* \* \* \*